Sept. 30, 1958     C. O. SMITH     2,853,845
SEED HARVESTER
Filed Sept. 10, 1956     2 Sheets-Sheet 1
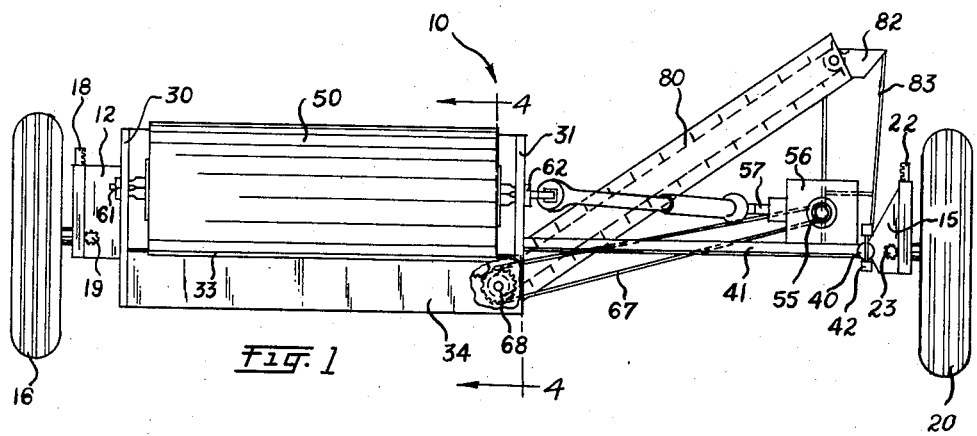
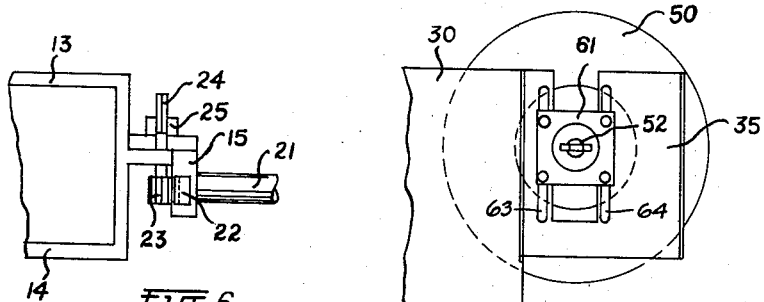
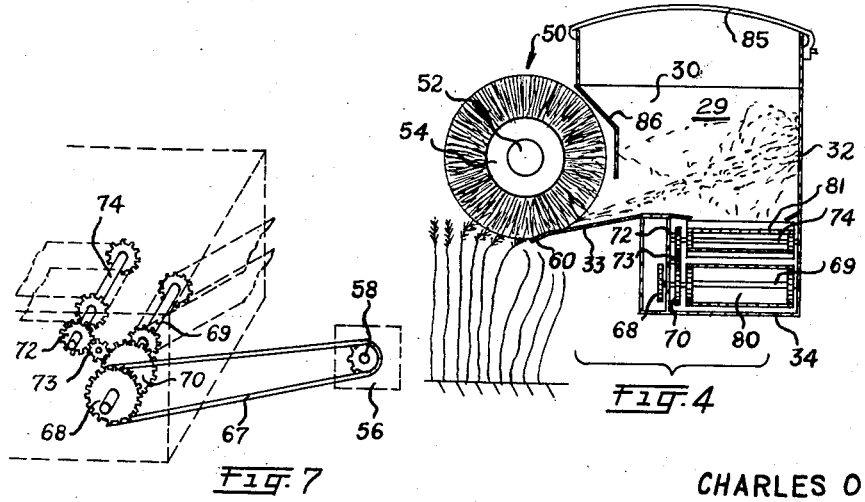
INVENTOR
CHARLES O. SMITH
BY    W. E. Sherwood
ATTORNEY Sept. 30, 1958 C. O. SMITH 2,853,845
SEED HARVESTER
Filed Sept. 10, 1956 2 Sheets-Sheet 2
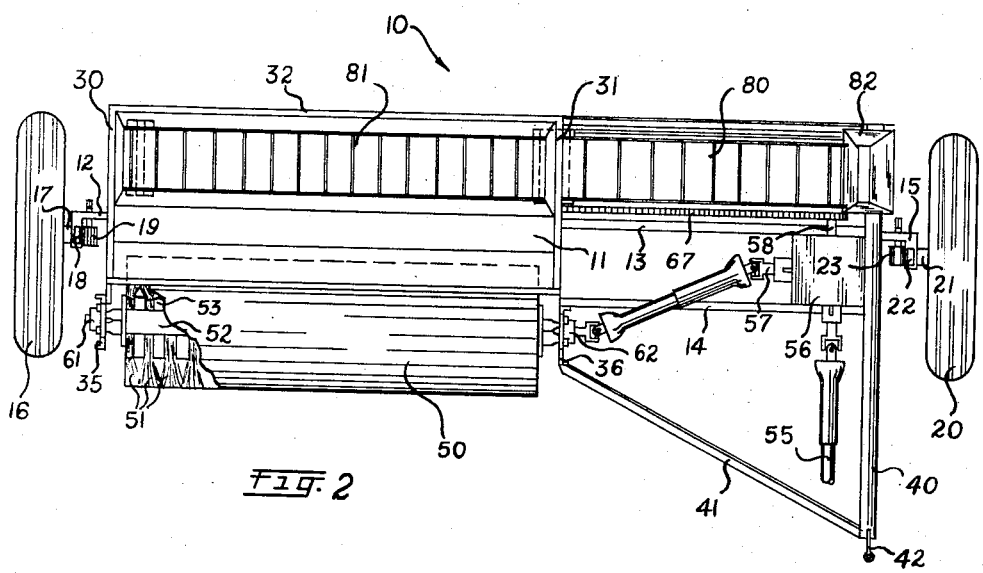
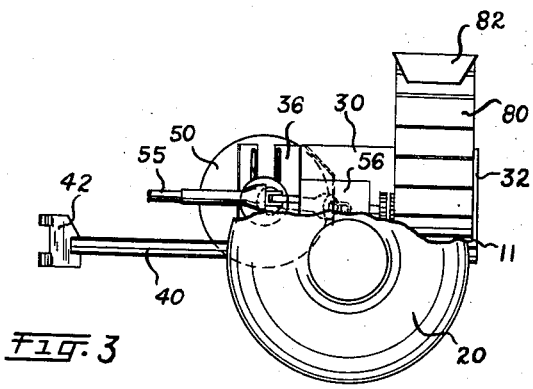
INVENTOR
CHARLES O. SMITH
BY W. E. Sherwood
ATTORNEY United States Patent Office 2,853,845
Patented Sept. 30, 1958

2,853,845

SEED HARVESTER

Charles O. Smith, Cynthiana, Ky.

Application September 10, 1956, Serial No. 608,811

4 Claims. (Cl. 56—128)

This invention relates to an improved seed harvesting machine and, more particularly, to a machine having a wide range of adaptability as to types of seed harvested thereby and to treatment of the seed so harvested. For purposes of disclosure, the machine is described in connection with its use in harvesting grass seed, specifically blue grass seed, although it is in no way limited to that particular usage.

Various forms of seed harvesters having revolving brushes and fans for producing an air stream to transport the removed seed from the path of the brush, have been proposed heretofore, but, so far as I am aware, all such harvesters have had certain limitations which it is an object of my invention to overcome. Furthermore, the conventional comb type, or sickle type, of seed harvesters have the disadvantage of harvesting an excessive amount of stubble or stalks which, by the practice of my invention, is substantially reduced, if not completely eliminated.

An object of the invention is to provide an improved seed harvester capable of harvesting seed in cleaner form.

Another object is to provide an improved seed harvester capable of harvesting an increased quantity of seed from a given field.

Another object is to provide an improved seed harvester capable of lacerating the seed heads to a selective degree thereby to expedite subsequent threshing and processing of the seed.

A further object is to provide an improved seed harvester capable of scarifying the seed integument, or coat, to a selective degree, thus allowing moisture to penetrate more rapidly as an aid in germination.

A still further object is to provide an improved seed harvesting brush.

According to my invention, I provide a wheeled carriage mounting an air plenum chamber in which harvested seed is separated from turbulent air and removed to a collection station and with an air stream forced continuously into that chamber by a cylindrical seed detaching brush rotating at high speed. The carriage moreover, is moved by a towing vehicle and the brush is driven by the prime mover of that vehicle independently of movement of the carriage wheels. The brush speed is such as to first pull the heads of the stalks to be harvested into contact with the brush and thereafter into contact with a rigid bar or apron mounted on the carriage. At this point the seed is brushed or stripped from the stalks, the detached seeds then being transported by the air stream from the brush into the plenum chamber. The rigid bar, or apron, may conveniently form an integral part of the plenum chamber, or may be a separate element attached thereto and projecting forwardly therefrom.

Other features and advantages of my invention will be apparent from the following detailed description, read in conjunction with the accompanying drawings which show a presently preferred embodiment of my invention applied to a blue grass seed harvester.

Fig. 1 of the drawings is a front elevation view of the seed harvesting machine, with parts broken away;

Fig. 2 is a plan view of the machine with parts broken away;

Fig. 3 is an end elevation of the machine with parts broken away;

Fig. 4 is a sectional view taken transversely of the brush and plenum chamber along line 4—4 of Fig. 1 and showing an enlarged plenum chamber;

Fig. 5 is a detail view showing an arrangement for adjusting the brush with respect to the apron;

Fig. 6 is a detail view showing an arrangement for adjusting the carriage with respect to the ground surface; and Fig. 7 is a diagrammatic view of the conveyor drive.

Referring first to Fig. 2, a carriage generally designated 10 is adapted for movement by a towing vehicle (not shown), such as a conventional tractor having a separate power take-off from its engine. Normally, the tractor operator also periodically serves the seed harvester although if desired, the harvester could be provided with a station for a second operator who would then handle the sacking of the seed without stopping the tractor.

The elongated carriage comprises a rigid body frame 11, at a first end of which a vertically disposed web section 12, attached thereto, is provided. At a second end, the frame may comprise a framework of rigid bars 13 and 14 at the outer ends of which is another vertically disposed web section 15. Each web section is provided with a vertical slot receiving a movable rack and with a laterally located aperture through which extends the shaft of a pinion engaging with a rack. At its first end, the carriage is provided with a wheel 16 suitably journalled for rotation upon a short stub shaft 17 rigidly attached at one end to rack 18 which is slidably mounted in web 12. Pinion 19, mounted for selective rotation in the side of web 12, engages with rack 18 and permits the wheel to be raised or lowered as desired with respect to frame 11, and thus to be selectively adjusted with respect to the surface of the ground. Any suitable means for clamping the pinion in place following its adjustment to the desired position, may be employed, one such means being shown in Fig. 6.

In similar fashion, the carriage is also provided at its second end with a wheel 20 suitably journalled for rotation upon a short stub shaft 21 rigidly attached at one end to rack 22 which is slidably mounted in web 15. Pinion 23, mounted for selective rotation in the side of web 15, engages with rack 22. As in the case of its companion pinion, pinion 23 may have an outwardly projecting non-circular and partially threaded portion 24 adapted to be engaged by a suitable tool for rotating the pinion when desired. A suitable clamping means such as a nut 25 may be mounted upon the threaded portion of the pinion projection, so that the pinion may be clamped against the web when the nut is turned in one direction and unclamped when it is turned in an opposite direction. By the described arrangement, the wheels may be adjusted independently of each other thus permitting the carriage frame to be operated at a non-uniform height with respect to the ground, should this be desired.

As best shown in Figs. 1 and 4, the carriage includes an air plenum chamber 29 having end walls 30 and 31, a rear wall 32, and a stepped bottom or floor, including a forwardly directed apron 33 and a conveyor recess generally indicated at 34. The apron may conveniently comprise a portion of the floor of the chamber extending substantially tangentially to the periphery of the seed-detaching brush, later to be described. Suitable brackets 35 and 36, one of which is shown in Fig. 5, are rigidly attached to the respective end walls 30 and 31 of the chamber and are provided with vertically disposed slots for a purpose later to become apparent.

Considering now Figs. 2 and 3, the thus described carriage is adapted for towing through a conventional hitch frame having a main towing member 40 and a laterally extending bracing member 41 joined thereto at one end. The second end of the bracing member is suitably joined to carriage frame 11 while the second end of the main towing member is joined to the carriage frame bars 13 and 14 adjacent the wheel 20. At its forward end, the main towing member is provided with a suitable pintle bracket 42 for receiving an attaching bolt for joining the harvester to the tractor.

As a significant feature of the invention, an elongated seed-detaching and air-stream-generating brush generally shown at 50 is mounted upon carriage 10 for rotation at high speed. This brush is constructed of a series of adjoining wear resisting disc-like sections 51 (Fig. 2) suitably mounted on a central shaft 52 and for weight saving purposes is provided with suitable plastic or aluminum spacer discs 53 interposed between the adjacent brush discs. The discs 51 preferably comprise steel wire or the like containing a large number of separate flexible wires fixed at one end to a central hub section 54 keyed to shaft 52. The free ends of these wires fly outwardly under centrifugal force and likewise spread axially of the shaft with the result that in operation a continuous cylindrical brush surface, formed of the free ends of the wire, is provided for contact with the seed heads and with the apron 33. Of special significance, the rotating wires induce a draft of air sufficient to pull the standing seed heads into contact with the revolving brush and apron and to transport the detached seed heads into the air plenum chamber along a path as diagrammatically shown in Fig. 4. For the purpose of driving the brush independently of the carriage movement, a conventional power shaft 55 extends from the power take-off of the tractor and through a conventional universal joint enters a conventional gear box 56 from which dual drive shafts 57 and 58 project.

These latter shafts are driven at different speeds, and merely as an illustration, in one satisfactory arrangement for harvesting blue grass seed, power shaft 55 may rotate at 585 R. P. M.; brush shaft 57 at 585 R. P. M.; and conveyor drive shaft 58 at 200 R. P. M.

As seen in Fig. 2, shaft 57 is joined through any suitable universal joint arrangement with shaft 52 of the brush and serves to drive the same by a direct coupling. As will be understood, when the engine of the tractor slows down at the end of a passage through a field, in order to make a turn for the next passage, shafts 55 and 52 also slow down and the momentum of brush 50 is quickly diminished. Moreover, as will later appear, the contact of the ends of the wires of the brush sections with the harvester bar 33 also exert a desired braking effect at the precise time when needed.

Depending upon the nature of the seed being harvested, my invention provides for adjustment of the brush surface relative to the apron to a degree not taught in prior apparatus with which I am familiar. As is known, the subsequent cleaning of harvested seed depends in large measure upon the ripeness of the seed, the moisture content thereof, and the amount of chaff or extraneous material harvested with the seed. As brush 50 comes into contact with the standing seed heads it pulls the same into the space above lip 60 of apron 33 of the frame. When adjusted to a first setting, for example, with the brush at its uppermost position in its mounting slots, the ends of the wires of the brush may barely touch the apron surface and the stream of air induced by the high speed rotation of the brush may serve mainly to dislodge ripe seed from their pods. By a closer or second setting, with the brush in the intermediate position in its mounting slots, as seen in Fig. 5, the brush surface may be caused to lacerate the seed heads and to detach the same in a somewhat shredded condition making them especially susceptible to later threshing and cleaning stages, which, as known, are usually conducted with air streams in conventional cyclone type separators. By a still closer or third setting, with the brush in the lower most position in the mounting slots, the brush surface may be caused to scarify the integument or coating of the seed kernel, thus enabling the seed later to absorb moisture and to germinate rapidly.

As shown in Fig. 5, the shaft 52 of the brush 50 is rotatably mounted at one end in a slidable plate 61, the other end of the same shaft being similarly mounted in a slidable plate 62. These plates are adjustably mounted in the slots of the respective brackets 35 and 36 located on the end walls of the air plenum chamber the mounting slots being seen at 63 and 64 for plate 61. Each plate is provided with suitable locking means such as nuts, for holding the brush shaft at a selected location with respect to the apron of that chamber. In Fig. 5, the above described three positions for mounting the shaft are shown, although any desired number of positions may be chosen without departing from any invention. The universal joint joining shafts 57 and 52 preferably provides for sliding movement, thus accommodating the brush adjustment above described.

For the purpose of removing the harvested seed from the carriage, I provide a conveyor system. Various systems may be employed and the system as shown represents only one possible form consisting of two sections, one of which is an elevating section. Referring now to Figs. 4 and 7, the shaft 58 from gear box 56 may drive a chain, belt or similar means 67, serving to actuate a sprocket 68 on shaft 69. The size of sprocket 68 preferably is such as to effect a substantial reduction in speed of rotation of shaft 69 as compared with shaft 58. Shaft 69 may carry a spur gear 70 adapted through an idler gear 73 to drive another spur gear 72 on an upper shaft 74. Each of shafts 69 and 74 carry spaced sprockets with which engage parallel, endless, side chains forming part of the conveyor sections. These sections respectively include an elevator section 80 and a horizontal section 81 feeding to the elevator section, each section being provided with conventional idler sprockets at their far ends; with a belt portion for carrying seed; and with spaced transverse flights across the belt portion.

The elevator section 80 may lift harvested seed to an elevated hopper 82 mounted upon a sack-supporting framework 83 affixed to a platform carried by frame 11. Preferably the drive chain 67 and elevator section 80 are enclosed in suitable casings, of any conventional construction but not shown herein for purposes of clarity of the drawings. The lower portion of the air plenum chamber is suitably recessed to receive the horizontal conveyor section 81, as seen in Fig. 4. As will be noted, the plenum chamber has an air space sufficient to receive the blast of air directed therein by the high speed brush 50 and is covered with a flexible fabric cover 85 having sufficient openings to permit air to bleed rapidly from the chamber. Adjacent its front, the chamber has a suitable baffle, or front wall, 86 in close contact with a substantial portion of the brush periphery, to prevent detached seed from being re-entrained in the air blast induced by the rotating brush.

The operation of the apparatus as thus described may be noted in Fig. 4. As the machine is towed toward the left, the brush rotates at high speed counterclockwise. The seed heads are drawn into contact with the wires of the brush and with the surface of the apron portion 69. As they are detached, they are entrained in a blast of air and fly against the rear wall 32 of the air plenum chamber wherein a turbulent air condition exists. Being heavier than air, the seed settles to the floor of the chamber and falls upon the moving conveyor 81. Any seed falling upon the forward portion of the chamber floor near the brush are instantly caught in the tangential blast of air from that brush and again moved to the rear wall 32 of the chamber.

Conveyor section 81 deposits the seed upon the elevating conveyor section 80 which carries it to the sack (not shown) suspended from hopper 82.

As indicated by the drawings, I prefer to mount the brush shaft 52 somewhat in advance of the forwardmost portion of the apron. Seed stalks are brought into contact with the brush well before they are carried into contact with that apron. After the seed head is harvested, the stalks flex rearwardly and are disengaged from the machine without being pulled from the ground. As a supplementary advantage, the resilient brush acts as a cushion, should the machine be inadvertently towed against a tree or stump and the chance of accidental breakage is thus lessened. Moreover, the wide and continuous brush surface presented to the field of seed stalks results in each seed stalk being brought into harvesting contact with the machine, thus providing a maximum yield of seed. The carriage is adjustable with respect to the ground level, as above described, and its high speed of rotation provides a suction effect which tends to lift depressed or bent seed stalks into its path of travel, thus further insuring a maximum yield.

While I have shown a particular embodiment of my invention, it will be understood, of course, that I do not wish to be limited thereto, since many modifications may be made; and I, therefore, contemplate by the appended claims to cover any such modifications as fall within the true spirit and scope of my invention.

What I claim as new and desire to secure by Letters Patent of the United States is:

1. A harvester for bluegrass seed and the like comprising, a moblie support having a suitable receptacle thereon for receiving detached seed, said receptacle having a front wall including an elongated horizontally arranged opening therein, an apron extending outwardly from the lower edge of said opening, an elongated cylindrical rotary brush extending in front of both said opening and said front wall, adjacent said front wall and in coacting relationship with said apron, and driving means for rotating said brush, whereby when said support and apron are moved adjacent heads of grass and said brush is rotated inwardly with respect to said apron, grass seed will be stripped from said heads and deposited in said receptacle.

2. A harvester as defined in claim 1 including means for adjusting the surface of said brush with respect to said apron thereby selectively to permit laceration of said seed heads and scarifying of the seed integument.

3. A harvester for bluegrass seed and the like comprising, a mobile support having a suitable receptacle thereon for receiving detached seed, means for towing said support, said receptacle having a front wall including an elongated horizontally arranged opening therein, an apron extending outwardly from the lower edge of said opening, an elongated cylindrical rotary brush extending in front of both said opening and said front wall, adjacent said front wall and in coacting relationship with said apron, and driving means for rotating said brush, said driving means being adapted to be driven independently of movement of said towing means.

4. A harvester as defined in claim 3 including a conveyor disposed in said receptacle for moving collected seed therefrom, said conveyor being adapted to be driven simultaneously with the driving means for said brush.

References Cited in the file of this patent

UNITED STATES PATENTS

| | | |
|---|---|---|
| 751,073 | Helgerson | Feb. 2, 1904 |
| 1,297,349 | Herr | Mar. 18, 1919 |
| 1,587,349 | Otis et al. | June 1, 1926 |
| 2,345,969 | Halley et al. | Apr. 4, 1944 |
| 2,409,309 | Peterson | Oct. 15, 1946 |
| 2,412,002 | Nelson et al. | Dec. 3, 1946 |
| 2,658,321 | Armstrong | Nov. 10, 1953 |
| 2,672,004 | Gay | Mar. 16, 1954 |